(12) United States Patent
Lee

(10) Patent No.: US 8,349,162 B2
(45) Date of Patent: Jan. 8, 2013

(54) ELECTRONIC OSMOTIC DEHYDRATOR OF ELECTROPHORESIS STYLE WITH A PHASE CONTROL USING THREE-PHASE CURRENT

(75) Inventor: Yeong Chae Lee, Busan (KR)

(73) Assignees: Korea Water Technology Inc. (KR); Yeong Chae Lee (KR)

( * ) Notice: Subject to any disclaimer, the term of this patent is extended or adjusted under 35 U.S.C. 154(b) by 404 days.

(21) Appl. No.: 12/745,323

(22) PCT Filed: Jun. 26, 2008

(86) PCT No.: PCT/KR2008/003664
§ 371 (c)(1),
(2), (4) Date: May 28, 2010

(87) PCT Pub. No.: WO2009/139517
PCT Pub. Date: Nov. 19, 2009

(65) Prior Publication Data
US 2010/0258442 A1    Oct. 14, 2010

(30) Foreign Application Priority Data

May 15, 2008    (KR) .................. 10-2008-0044901

(51) Int. Cl.
*B01D 61/56*    (2006.01)
(52) U.S. Cl. ........................ 204/649; 204/648
(58) Field of Classification Search .................. 204/648, 204/649
See application file for complete search history.

(56) References Cited

U.S. PATENT DOCUMENTS 5,192,413 A    3/1993    Yamaguchi et al.
2009/0114540 A1 *  5/2009   Lee .............................. 204/600

FOREIGN PATENT DOCUMENTS

KR           100275035        9/2000
KR     10-2008-0055764        6/2008

* cited by examiner

*Primary Examiner* — Arun S Phasge
(74) *Attorney, Agent, or Firm* — Fish & Richardson P.C.

(57) ABSTRACT

The present invention relates to An electronic osmotic dehydrator of electrophoresis style with a phase control using three-phase current, and more specifically, to An electronic osmotic dehydrator of electrophoresis style with a phase control using three-phase current, which can minimize an unnecessary loss of power consumed in the rotating drum itself by emboding the applying structure of the DC power supplied to the dehydrating domain of the electro-osmotic dehydrator so that a strength of the electric field generated between the rotating drum and the caterpillar may be variably controlled depending upon a sludge volume, and improving a structure of the rotating drum to which the DC power is applied, when forming an electronic osmotic dehydrator comprising a rotating drum in the cylindrical form, a caterpillar running on an endless track at a certain space from the rotating drum and two filter cloth belts for transferring and dehydrating the sludge as wound between the drum and the caterpillar, which is a continued invention of 'an electro-osmotic dehydrator (K.R. Patent Application No. 10-2004-007759)', 'an electro-dehydrator of a phase control type (K.R. Patent Application No. 10-2005-009928)', and 'an electro-osmotic dehydrator (K.R. Patent Application No. 10-2007-046494)' which were already filed by the applicant of the present invention.

5 Claims, 6 Drawing Sheets

US 8,349,162 B2

ELECTRONIC OSMOTIC DEHYDRATOR OF ELECTROPHORESIS STYLE WITH A PHASE CONTROL USING THREE-PHASE CURRENT

TECHNICAL FIELD

The present invention relates to an electronic osmotic dehydrator of electrophoresis style with a phase control using three-phase current, and more specifically, to an electronic osmotic dehydrator of electrophoresis style with a phase control using three-phase current, which can minimize an unnecessary loss of power consumed in the rotating drum itself by emboding the applying structure of the DC power supplied to the dehydrating domain of the electro-osmotic dehydrator so that a strength of the electric field generated between the rotating drum and the caterpillar may be variably controlled depending upon a sludge volume, and improving a structure of the rotating drum to which the DC power is applied, when forming an electronic osmotic dehydrator comprising a rotating drum in the cylindrical form, a caterpillar running on an endless track at a certain space from the rotating drum and two filter cloth belts for transferring and dehydrating the sludge as wound between the drum and the caterpillar, which is a continued invention of "an electro-osmotic dehydrator (K.R. Patent Application No. 10-2004-007759)", "an electro-dehydrator of a phase control type (K.R. Patent Application No. 10-2005-009928)", and "an electro-osmotic dehydrator (K.R. Patent Application No. 10-2007-046494)" which were already filed by the applicant of the present invention.

BACKGROUND ART

Generally, an electronic osmotic dehydrator of electrophoresis style is an apparatus for separating the moisture contained in the sludge having the dielectric (material generating an electrical induction action) property by electrophoresis generated by an electric field.

It has been known to the public that when the DC power with positive (+) polarity and the DC power with negative (−) polarity are respectively applied to the rotating drum and the caterpillar of the electro-osmotic dehydrator as operated by electrophoresis, that is to say, when the polarities of the DC power applied to the rotating drum and the caterpillar are opposite each other, an electric field (an electrical domain generating electrical induction between an object having positive (+) polarity of the DC power and an object having negative (−) polarity of the DC power) is generated in a space between the rotating drum and the caterpillar through which the sludge passes, and thereby, most of the moisture contained in the sludge passing through a section where the rotating drum and the caterpillar of the electro-osmotic dehydrator operated by electrophoresis rotate on the same path is separated into a space at the lower of the caterpillar having a spaced structure by electrophoresis and the solid sludge from which moisture is removed is separated and discharged by a filter cloth belt.

Meanwhile, in the case of the an electronic osmotic dehydrator of electrophoresis style installed in a sewage treatment plant or a manufacturing plant which discharges a large volume of foul and waste water sludge, the high DC power should be applied to it in order to increase the strength of an electric field in its dehydrating domain. However, in the dehydrating domain of an electronic osmotic dehydrator of electrophoresis style of most manufacturers using the three-phase alternating current power (including single phase alternating current) as the input power, the separate DC power supplying apparatus (transformer, battery, rectifier) for generating an electric field is required.

However, when each DC power with the opposite polarity is respectively applied to the rotating drum and the caterpillar to form an electric field in the dehydrating domain of the conventional an electronic osmotic dehydrator of electrophoresis style as described above, the DC power is applied to all the rotating sections of the caterpillar running on an endless track, and as a result, the unnecessary DC power is applied to the caterpillar running on the section where the rotating path of the caterpillar and the rotating path of the rotating drum are not the same, which causes a huge power loss problematically.

For this reason, the applicant of the present invention filed a patent application for an invention entitled "an electro-osmotic dehydrator" (K.R. Patent Application No. 10-2004-007759) having the DC power applying structure for applying the DC power of one polarity only to the section of the caterpillar where the rotating path of the rotating drum and the rotating path of the caterpillar are the same in order to enable the electric field to be generated only in the dehydrating domain of an electronic osmotic dehydrator of electrophoresis style on Feb. 6, 2004, and its patent was registered on Nov. 8, 2004 (Registration No. 10-0457628). Also, the applicant of the present invention filed a patent application for an invention entitled "an electronic dehydrator of a phase control type" (K.R. Patent Application No. 10-2005-009928) to enable a strength of the DC power to be variably controlled depending upon the sludge volume passing through the dehydrating domain or the sludge type to be treated by providing a separate phase control circuit unit to a rectifier for applying each DC power having the opposite polarity respectively to the caterpillar and the outer surface of the rotating drum of an electronic osmotic dehydrator of electrophoresis style, on Feb. 3, 2005 and its patent was registered on Nov. 8, 2005 (K.R. Patent Registration No. 10-0528579).

However, in the case of the "electro-osmotic dehydrator (K.R Patent Application No. 10-2004-007759), it has a limitation that it cannot control the strength of the DC power variably depending upon the type or the volume of the sludge passing through the de-hydrating domain because the strength of the DC power applied to the dehydrating domain is constant. In the case of "an electric dehydrator of a phase control type" (K.R. Patent Application No. 10-2005-009928), its specification does not describe explicitly the DC power applying structure where the DC power with one polarity, which is applied to the caterpillar, is applied only to the path in the case that the rotating path of the rotating drum and the rotating path of the caterpillar are the same.

On the other hand, a general rotating drum constructing an electronic osmotic dehydrator of electrophoresis style is an apparatus for generating the electric field to induce the electrophoresis while guiding the waste water sludge into the dehydrating domain along with the caterpillar. Considering the rotating drum having a structure that the DC power with one polarity is applied to the caterpillar and the DC power with opposite polarity is applied to it, the rotating drum should be made of a material having the corrosion resistance and the abrasion resistance against the waste water sludge and further having the high electric conductivity for generation of an electric field.

However, since the conventional general rotating drum constructing an electronic osmotic dehydrator of electrophoresis style has a structure formed by making a stainless material plate into a cylindrical drum, when the dehydrating work is performed on the sludge by the electrophoresis caused by the electric field generated in the dehydrating domain, the space through the sludge passes between the rotating drum and the caterpillar, the rotating drum of stainless material generates electrolysis through its electrochemical reaction with the sludge. As a result, large and small corrosions take place in the rotating drum, and further the rotating drum is heated with the coulomb heat generated by the electrophoresis at high temperature to deform the appearance of the rotating drum having a cylindrical shape. This shortens the lifetime of the rotating drum and degrades the electric conductivity of the rotating drum problematically.

Therefore, the applicant of the present invention filed a patent application for an invention entitled "an electro-osmotic dehydrator" (K.R. Patent Application No. 10-2007-046494) on May 14, 2004, relating to a structure of a rotating drum to improve corrosion resistance and abrasion resistance and electric conductivity of the rotating drum of an electronic osmotic dehydrator of electrophoresis style at the same time. That is to say, the rotating drum has a structure that a copper plate having very high electric conductivity, a titanium plate having excellent corrosion resistance and abrasion resistance and a platinum-based metal coating agent are closely stacked in order on the stainless material plate and they are fixed by fastening bolts penetrating through the stacked part, which are provided in its outer circumference at a given interval.

However, when the DC power with one polarity is applied to the rotating drum of the "electro-osmotic dehydrator (K.R. Patent Application No. 10-2007-046494), the DC power does not electrify only the platinum-based coating agent of the rotating drum but a large portion of the DC power electrified the inner copper plate of the rotating drum having very high electric conductivity through the fastening bolts penetrating through the inside of the rotating drum. Therefore, when the electric field is generated by applying the DC power to the rotating drum in the dehydrating domain, a large portion of the DC power determining the strength of the electric field gets to flow to the inner copper plate of the rotating drum having very high electric conductivity so that the strength of the DC power drops drastically on the outer surface of the rotating drum, causing an unnecessary power loss, which is a problem of the said rotating drum.

DISCLOSURE OF INVENTION

Technical Problem

A first objective of the present invention for solving the abovementioned problems is to provide an electronic osmotic dehydrator of electrophoresis style with a phase control using three-phase current, which improves the conventional structure that the power is applied to the entire caterpillar and controls variably the strength of the electric field generated only in the dehydrating domain by using the three-phase alternating current power as the input power of an electronic osmotic dehydrator of electrophoresis style and applying the variable DC power to the rotating drum and the caterpillar corresponding to the dehydrating domain through a phase control of the three-phase alternating current power.

Another objective of the present invention is to provide an electronic osmotic dehydrator of electrophoresis style with a phase control using three-phase current, which can minimize a power loss occurring in a rotating drum itself by fixing a multi-layer plate of the rotating drum constructing an electronic osmotic dehydrator of electrophoresis style by a plural number of tapping bolts made of an insoluble titanium material and further welding the joint portion of the cylindrical drum with a round bar of a stainless material.

One more objective of the present invention is to provide an electronic osmotic dehydrator of electrophoresis style with a phase control using three-phase current, which can minimize the coulomb heat resulting from the contact of the rotating drum with an electrode bar by applying the variable DC power to the rotating drum and the caterpillar through the surface contact by the electrode bar of the DC power applying apparatus comprising a brush and a slip ring in one body and laying a copper plate having very high electric conductivity on the inner circumference of the rotating drum of which the surface gets to be in contact with the electrode bar.

Technical Solution

The construction of the present invention for achieving the said objectives is described more in detail.

First, FIGS. 1 and 2 show the whole assembling construction of an electronic osmotic dehydrator of electrophoresis style of the present invention, which comprises a cylindrical rotating drum (100) turning on a drum axis (110), a caterpillar (200) running on an endless track at a given space from the rotating drum (100), two filter cloth belts (300) wound between the rotating drum (100) and the caterpillar (200) for conveying and dehydrating sludge, and the DC power applying apparatus (400) fixed to both sides or one end of the drum axis (110) for applying the variable DC power (2)(2') to an inner circumference of the rotating drum (100) and further an inner circumference of the caterpillar (210) in a section where the rotating drum (100) and the caterpillar (200) rotate on the same path, wherein the DC power applying apparatus (400), which converts the three-phase alternating current power into the variable DC power through a phase control circuit (500), is constructed in the form that a plural number of electrode bars (420a)(420b) of which inner and outer surfaces, which are combined each other with a fixed plate (410) fixed to one end or both ends of the drum axis (110) being put as a boundary between them, coupled with a pair of electrode bar installing plates (430a)(430b), and a dehydrating domain (600), where an electric field is generated and sludge passes, is formed in the space corresponding to the same path on which the rotating drum (100) and the caterpillar (200) rotate.

Meanwhile, a brush (421) constructing the electrode bars (420a)(420b) is made of tetragonal graphite of a conductive material, and a slip ring (422) comprises a case (422a) and a spring (422b) supporting elastically the brush (421) installed inside the case (422a).

On the other hand, each structure of the drum axis (110), the caterpillar (200), the filter cloth belt (300), the DC power applying apparatus (400) and the dehydrating domain (600) and the combining structure of each structure and the rotating drum (100) are the same as each structure and the combining structure disclosed in the patent specification of an invention entitled "an electro-osmotic dehydrator" (K.R. Patent Application No. 10-2004-007759) filed by the applicant of the present invention. Therefore, the detailed description of each structure and the combining structure and the effect thereof, which do not feature the present invention, is omitted.

Thus, while each structure and the combining structure disclosed in the patent specification of an invention entitled "an electro-osmotic dehydrator" (K.R. Patent Application No. 10-2004-007759) filed by the applicant of the present invention are considered as a premise of the present invention, the structure of the improved rotating drum (100) and the variable applying structure of the DC power applied to the section of the dehydrating domain (600) according to the present invention are the characteristics of the present invention.

And, FIGS. 3 and 4 show an electrical wiring diagram of the power applying structure of the present invention, wherein the input power (1) of an electronic osmotic dehydrator of electrophoresis style with a phase control according to the present invention is directly connected with the R phase, the S phase, and the T phase of the three-phase alternating current power, and the rotating drum (100) and the caterpillar (210) in the section corresponding to the dehydrating domain (600) are connected with the variable DC power (2)(2') respectively, which is made available by converting the three-phase alternating current power into the variable DC component having both polarities, wherein the variable DC power (2)(2') applied respectively to the rotating drum (100) and the caterpillar (210) has a structure applying opposite polarities each other.

Meanwhile, the phase control circuit (500) of the present invention has a construction where thyrist electrical elements [SCR 520, TRIAC 530] with a gate terminal, where the strength of the DC power can be variably controlled through a separate controller (510), among rectifiers [DIODE, SCR, TRIAC, DIAC] for converting the three-phase alternating current power into the DC power, are connected.

And, FIGS. 5 and 7 show the cylindrical rotating drum and its combining structure according to the present invention. The rotating drum has a construction wherein it comprises a multi-layer plate (120) on which a stainless plate (121) of a corrosion resistance material, a copper plate (122) having very high electric conductivity, a titanium plate (123) having excellent abrasion resistance and a platinum-based coating agent (124) with corrosion resistance and high electric conductivity are stacked in order, and a plurality of fastening holes (125)(125') are formed by perforating the outer circumference of the multi-layer plate (120), and a plurality of round bars (130)(130') of a stainless material are inserted into the respective fastening holes (125)(125') and then fixed thereto by welding them. Also, the rotating drum has a construction wherein a plurality of insoluble tapping bolts (140)(140') coated with titanium are screw-combined with the respective round bars (130)(130') and the copper plate (122') having very high electric conductivity is further laid on the stainless plate (121) at the end of the inner circumference of the rotating drum (100) of which the surface is in contact with the brush (121) of conductive graphite among the electrode bars (420a)(420b) of the DC power applying apparatus (400).

Advantageous Effects

The present invention enables the DC power to be applied only to the section of the dehydrating domain (600) required for generating an electric field and further the strength of the DC power applied to be variably controlled depending upon the volume or the state of sludge to be treated in the dehydrating domain (600). Thereby, it has an effect to reduce power consumption to the minimum and further treat a small volume of sludge as well as a large volume sludge rapidly without consuming power unnecessarily. The multi-layer plate (110) constructing the rotating drum (100) is tightly fixed by the insoluble tapping bolts (140)(140') fastened with the round bars (130)(130') having low electric conductivity, and thereby, the variable DC power applied to the rotating drum (100) is prevented from flowing into the rotating drum (100). As a result, it has a great effect to increase the dehydrating performance by increasing the strength of the electric field in the dehydrating domain (600).

DETAILED DESCRIPTION OF MAIN ELEMENTS

Figure 1:
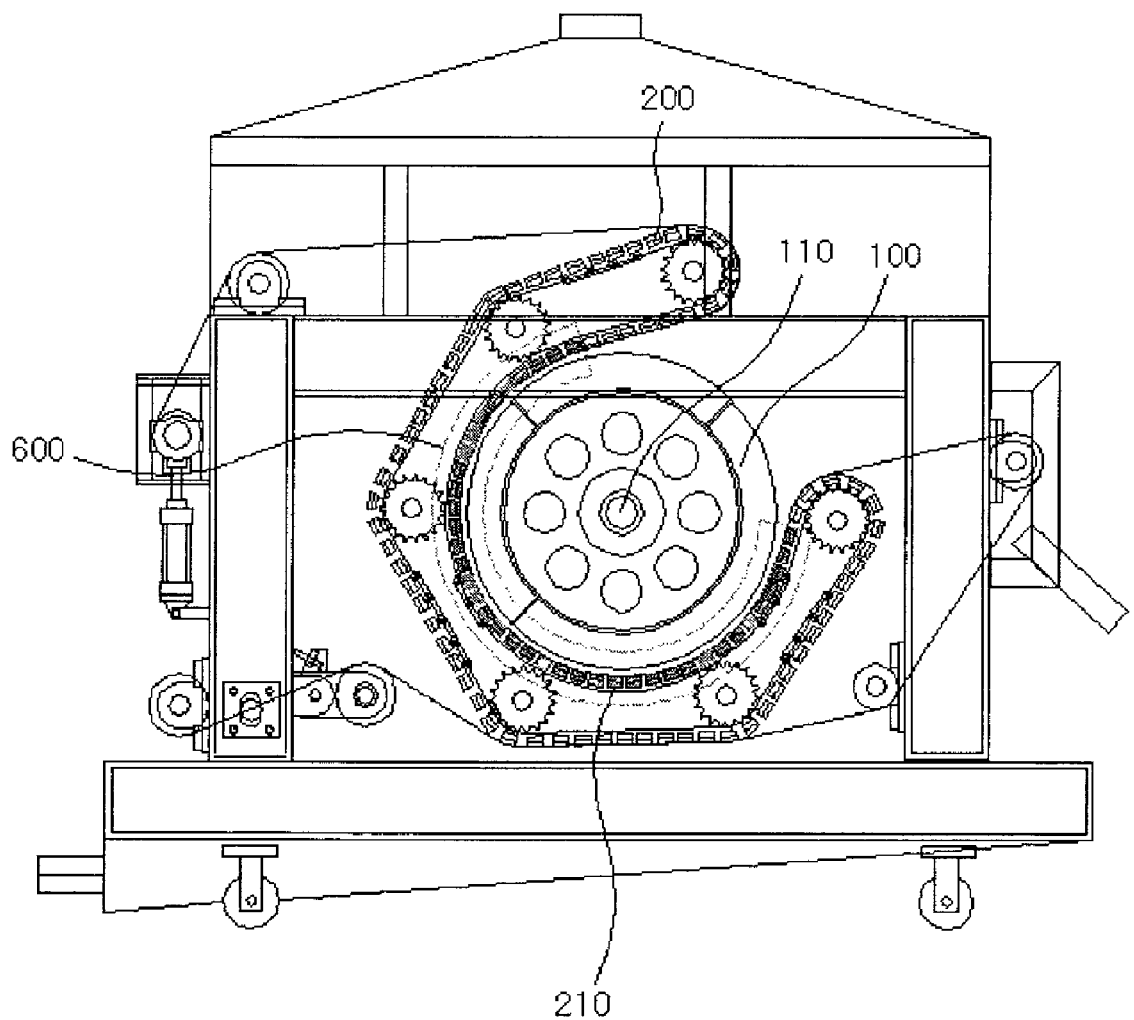
FIG. 1 is a view showing the overall combining construction of the present invention.
Figure 2:
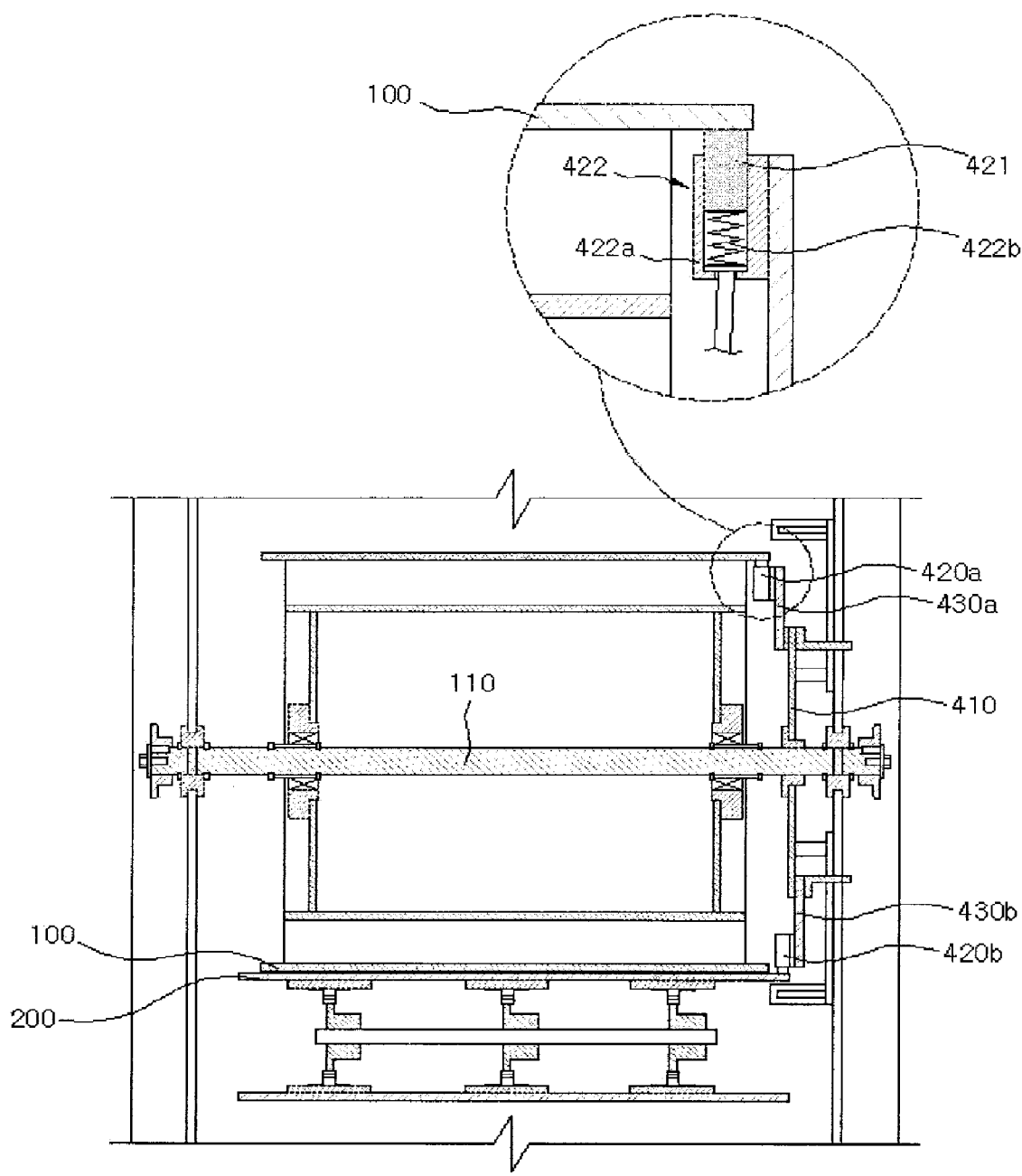
FIG. 2 is a cross-sectional view showing the overall combining construction of the present invention.

1: Input power 2, 2': Variable DC power
100: Rotating drum 110: Drum axis
120: Multi-layer plate 121: Stainless plate
122, 122': Copper plate 123: Titanium plate
124: Platinum-based coating agent 125, 125': Fastening hole
130, 130': Bar 140, 140': Tapping bolt
200: Caterpillar 210: Caterpillar in a given section
300: Filter cloth belt 400: DC power applying apparatus
410: Fixing plate 420a, 420b: Electrode bar
421: Brush 422: Slip ring
422a: Case 422b: Spring
430a, 430b: Electrode installing plate
500: Phase control circuit
510: Controller 520, 521, 522: SCR
530, 531, 532: TRIAC 600: Dehydrating domain

BEST MODE FOR CARRYING OUT THE INVENTION

Hereinafter, the variable DC power applying structure and the improved structure of the rotating drum (100) featuring the present invention are described in detail.

Figure 3:
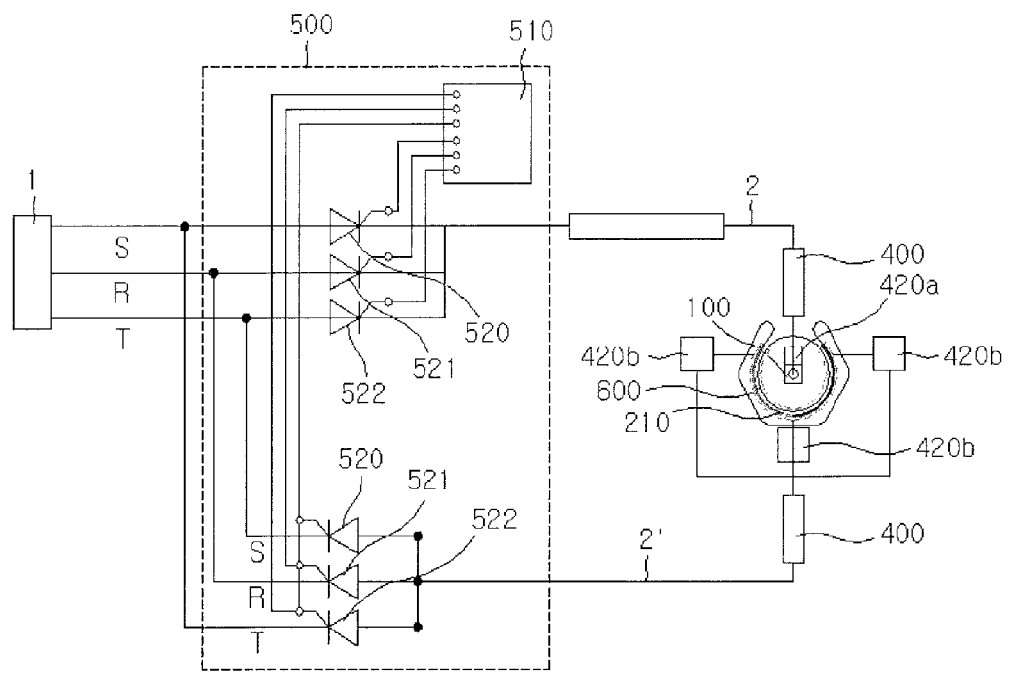
FIGS. 3 and 4 are electrical wiring diagrams showing a power applying structure of the present invention.
Figure 4:
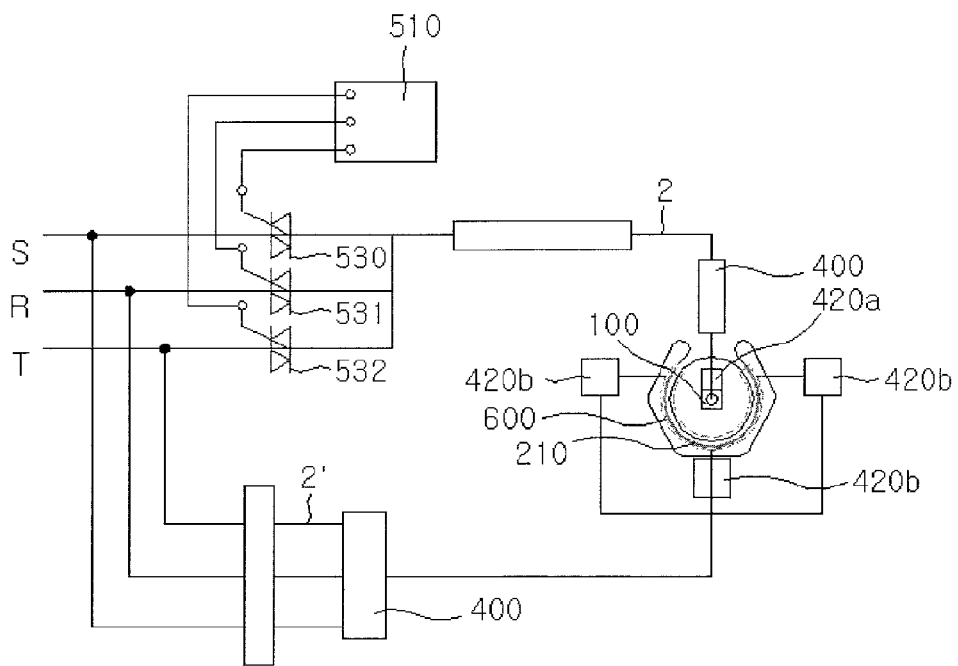
Figure 5:
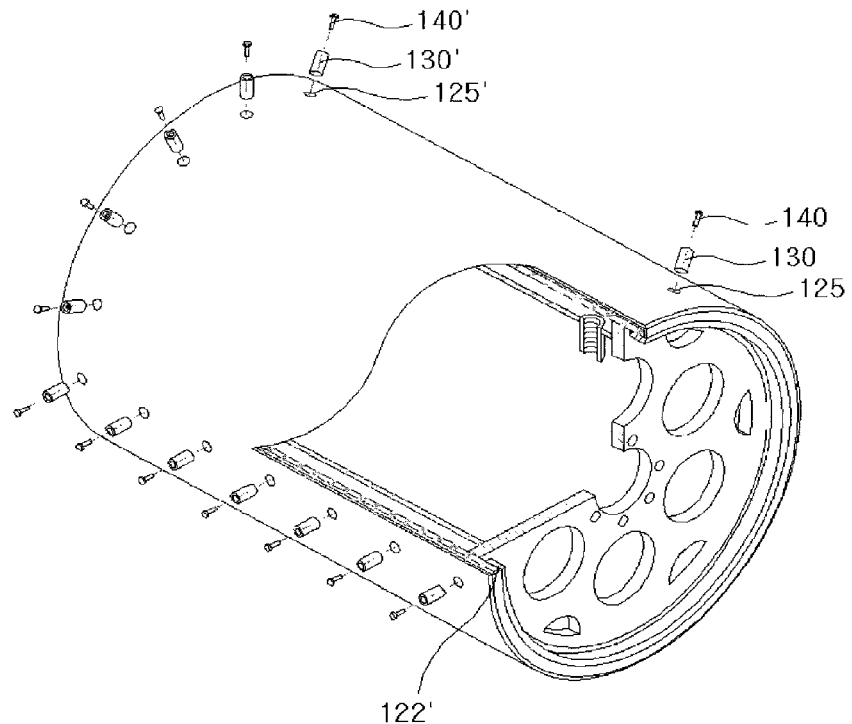
FIG. 5 is a view showing an embodiment of a rotating drum of the present invention.
Figure 6:
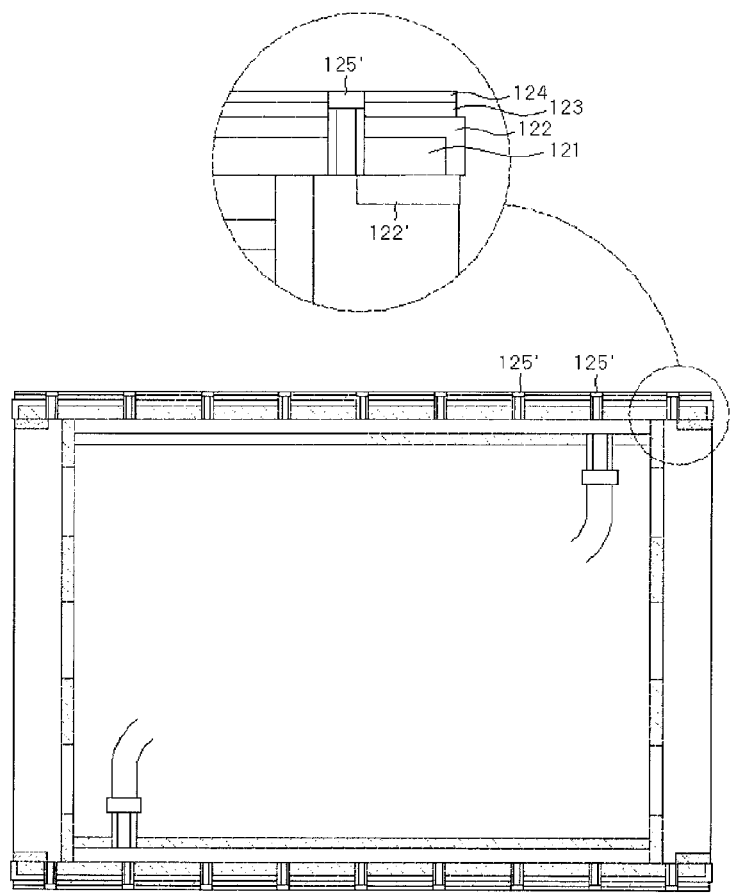
FIG. 6 is a view showing combination of a multi-layer plate constructing the rotating drum of the present invention.
Figure 7:
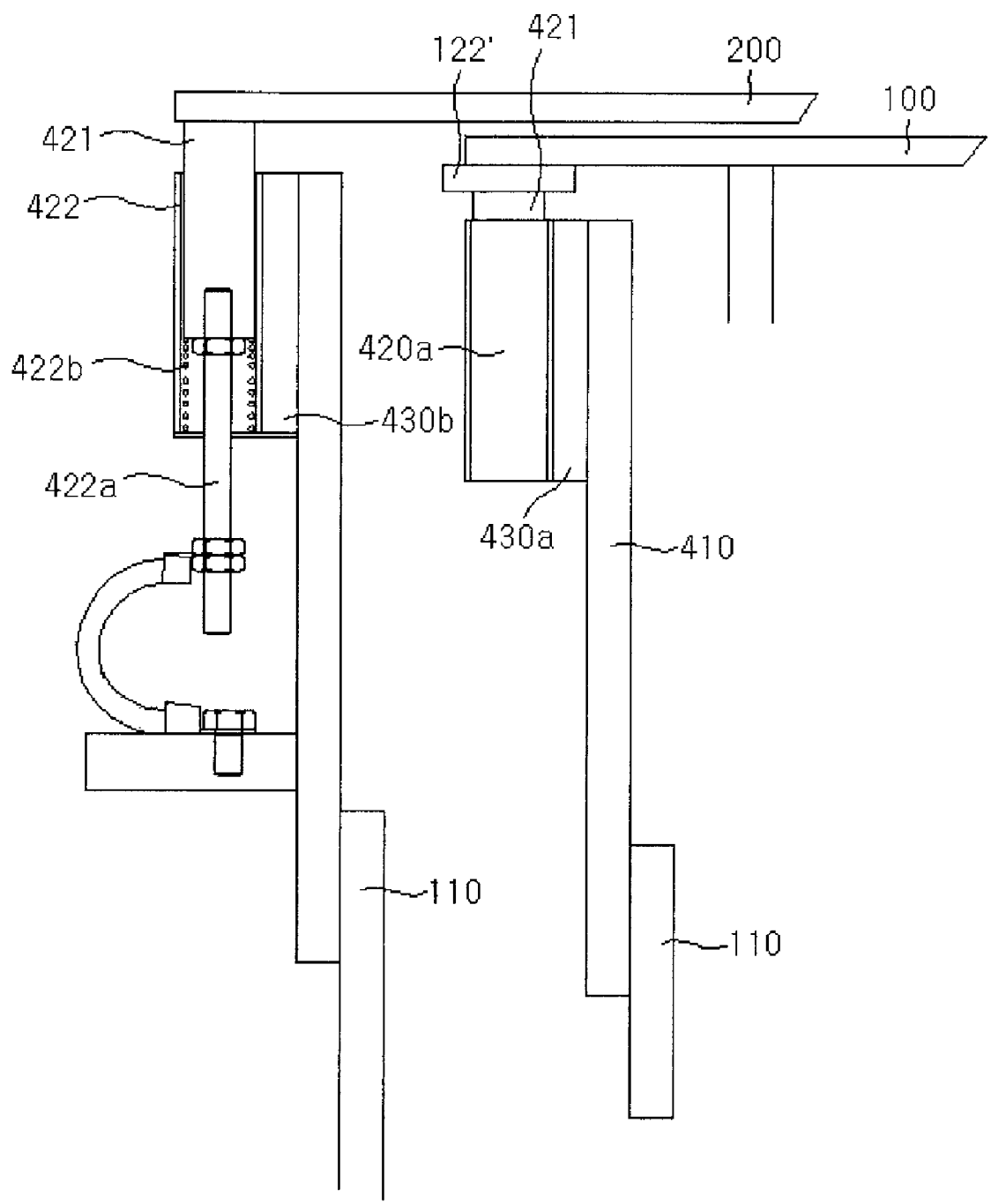
FIG. 7 is a view showing combination of the concave section and the state that a copper is laid on an inner circumference of the rotating drum.

In the first place, the power applying structure of the present invention is examined. As shown in FIGS. 3 and 4, in order to generate an electric field in the dehydrating domain (600) of an electronic osmotic dehydrator of electrophoresis style of the present invention, the three-phase alternating current power is used as the input power (1) for the rotating drum (100) and the caterpillar (210) in a given section, and the three-phase alternating current power is converted into the DC power by connecting each phase (R-phase, S-phase, and T-phase) of the three-phase alternating current power to SCR electrical elements (520, 521, 522) or TRIAC electrical elements (530, 531, 532) of the phase control circuit (500). Further, the variable DC power (2)(2') gets to be applied through a controller (510) connected with a gate (GATE) terminal of each of the said electrical elements.

Figure 8:
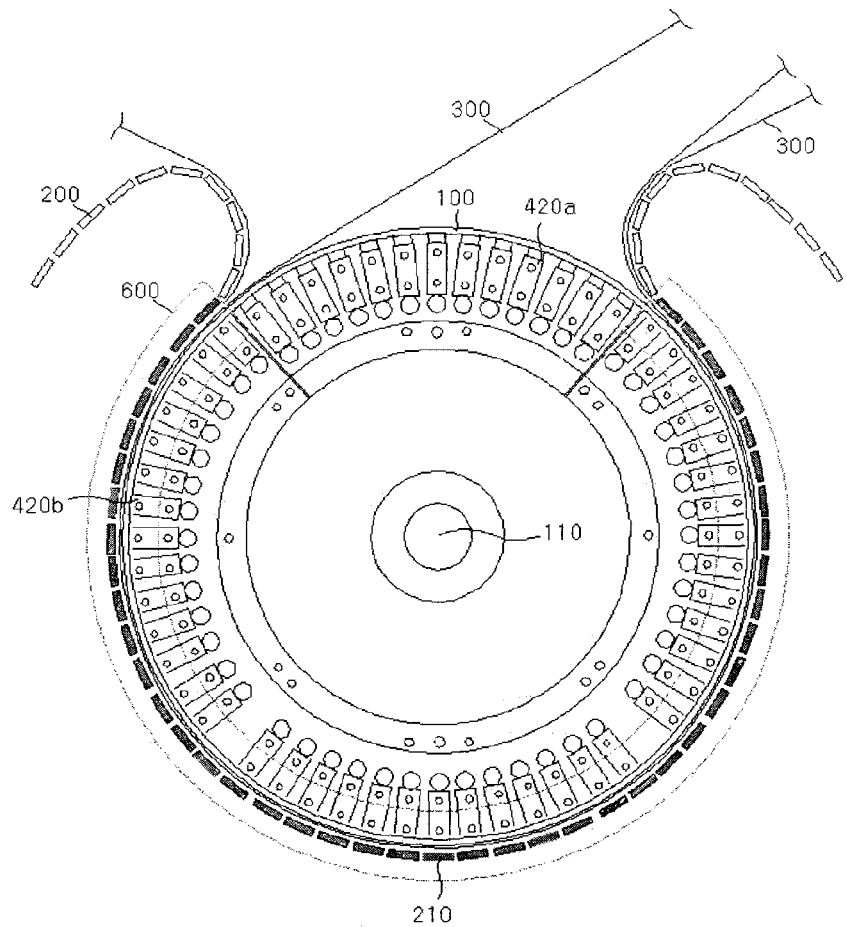
FIG. 8 is a view showing the combining construction of the DC power applying apparatus according to one embodiment of the present invention.

And, as shown in FIG. 8, the DC power (2) with one polarity of the variable DC power (2)(2') is made to be in contact with an inner circumference of the rotating drum (100) through a brush (421) of a plurality of electrode bars (420a) constructing the DC applying apparatus (400) and the other DC power (2') with the opposite polarity is made to be in contact with an inner circumference of the caterpillar (210) in the section of the dehydrating domain (600) through a brush (421) of a plurality of other electrode bars (420*b*) constructing the DC applying apparatus (400). Thereby, the variable DC power (2)(2') applied to an electronic osmotic dehydrator of electrophoresis style of the present invention is applied only to the rotating drum (100) and the caterpillar (210) in the section of the dehydrating domain (600), which is as disclosed in the specification of an invention entitled 'an electro-osmotic dehydrator" (K.R. Patent Application No. 10-2004-007759) filed by the applicant of the present invention.

Figure 9:
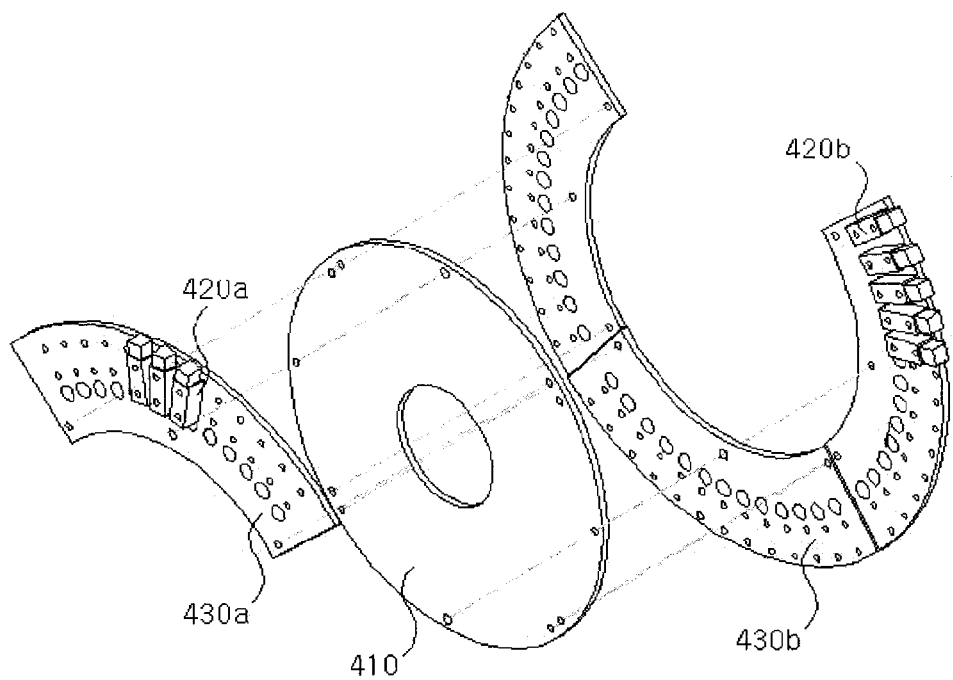
FIG. 9 is a perspective view showing combination of the DC power applying apparatus according to one embodiment of the present invention

Meanwhile, as shown in FIG. 9, a structure that a plurality of electrode bars (420*a*)(420*b*) constructing the DC power applying apparatus (400) are combined with a pair of electrode installing plates (430*a*)(430*b*), a structure that the brush (421) constructing the respective electrode bars (420*a*)(420*b*) is made of tetragonal graphite of a conductive material and a structure that a slip ring (422) is provided by combining a case (422*a*) with a spring (422*b*) elastically supporting the brush (421) installed inside the case (422*a*) are also as disclosed in the specification of an invention entitles 'an electro-osmotic dehydrator" (K.R. Patent Application No. 10-2004-007759) filed by the applicant of the present invention.

However, in the power applying structure of the present invention, the three-phase alternating current power is used as the input power (1), and it is used as an operation power for most of the driving devices. When the DC power is applied only to the rotating drum (100) and the caterpillar (210) in the section of the dehydrating domain (600), each phase of the three-phase alternating current power (R phase, S phase, T phase) is connected to a controller (510) of a phase control circuit (500) and SCR electrical elements (520, 521, 522) or TRIAC electrical elements (530, 531, 532). Thereby, a structure that the variable DC power (2)(2'), which is variable depending upon the state of sludge passing through the dehydrating domain (600), can be applied is characteristically made available.

Specifically, as the input power (1) applied an electronic osmotic dehydrator of electrophoresis style of the present invention, the three-phase alternating current power is used to operate most of the driving devices constructing the electro-osmotic dehydrator. In the case that a large volume of sludge or a small volume of sludge has to be selectively treated in the dehydrating domain (600), the strength of the gate signal voltage for controlling the on/off operation of the SCR electrical elements (520, 521, 522) or the TRIAC electrical elements (530, 531, 531) connected with the three-phase alternating current power is controlled by the controller (510) of the phase control circuit (500). Thereby, the electric field generated in the dehydrating domain (600) gets to be controlled.

That is to say, the power applying structure of the present invention is what the power applying structure disclosed in the specification of an invention entitled 'an electro-osmotic dehydrator" (K.R. Patent Application No. 10-2004-007759) filed by the applicant of the present invention is more specifically embodied so that the DC power may be applied only to the section required for generating an electric field and further the strength of the DC power applied depending upon the volume or the state of the sludge to be treated in the dehydrating domain (600) may be variably controlled. Thereby, it enables power consumption to be reduced to the minimum and further a small volume of sludge as well as a large volume of sludge to be rapidly treated without consuming unnecessary power.

Next, the improved structure of the rotating drum (100) of the present invention is examined.

The copper plate (122') with very high electric conductivity is provided in the end of the inner circumference of the cylindrical rotating drum (100) of an electronic osmotic dehydrator of electrophoresis style of the present invention. When the copper plate (122') of the rotating drum (100) to which the variable DC power is applied gets in contact with the brush (411) of conductive graphite of the electrode bar (410) of the DC power applying apparatus (400), the variable DC power applied from the DC power applying apparatus (400) is applied to the rotating drum (100) without any particular load resistance since both the brush (411) and the copper plate (122') are made of a material with very high electric conductivity. Thereby, any unnecessary power loss of the variable DC voltage can be prevented.

And, as shown in FIG. 8, the rotating drum (100) has a structure that the stainless plate (121), the copper plate (122), the titanium plate (123), the platinum-based coating agent (124) are stacked in order from the cylindrical inner circumference. When the dehydrating work is performed by applying the variable DC power to the rotating drum (100), the platinum-based coating agent (124) and the titanium plate (123) laid in sequence from the outer surface of the rotating drum (100) cause an electrolysis reaction resulting from electrochemical reaction with sludge to be minimized. As a result, corrosion resistance and abrasion resistance is improved and the copper plate can maintain the electric field at a high strength, and thereby, the durability of the rotating drum (100) can be increased, which is as disclosed in the specification of an invention entitled 'an electro-osmotic dehydrator" (K.R. Patent Application No. 10-2004-007759) filed by the applicant of the present invention.

Meanwhile, as shown in FIG. 9, the rotating drum (100) of the present invention has a structure that a plurality of round bars (130)(130') made of a stainless material are inserted into each of fastening holes (125)(125') provided in the edge of the multi-layer plate (110) and fixed thereto by welding, and each plate is fixed by a plurality of tapping bolts (140)(140') made of an insoluble titanium material, as combined with each of the round bars (130)(130'). Therefore, when the variable DC power is applied to the rotating drum (100) to perform any dehydrating work, the variable DC power applied through the copper plate (122') installed on the end of the inner circumference of the cylindrical rotating drum (100) does not flow to the copper plate (122) stacked inside the multi-layer plate (110), but it is applied to the platinum-based coating agent (124) laid on the outer surface of the rotating drum (100) through the tapping bolts (140)(140'). Thereby, the strength of the electric field in the dehydrating domain can be increased.

That is to say, the present invention can eliminate a disadvantage of the rotating drum of the prior invention entitled "the electro-osmotic dehydrator" (K.R. Patent Application No. 10-2007-046494 filed by an applicant of the present invention, which is that most of variable DC power gets to flow to the copper plate (122) having very high electric conductivity as laid inside the multi-layer plate (110) and thus, the required DC power is not applied to the platinum-based coating agent (124) laid on the outer surface of the rotating drum (100).

INDUSTRIAL APPLICABILITY

The present invention enables the DC power to be applied only to the section of the dehydrating domain required for generating an electric field and further the strength of the DC power applied to be variably controlled depending upon the volume or the state of sludge to be treated in the dehydrating domain. Thereby, it has an effect to reduce power consumption to the minimum and further treat a small volume of sludge as well as a large volume sludge rapidly without consuming power unnecessarily. The multi-layer plate constructing the rotating drum is tightly fixed by the insoluble tapping bolts fastened with the round bars having low electric conductivity, and thereby, the variable DC power applied to the rotating drum is prevented from flowing into the rotating drum. As a result, it has a great effect to increase the dehydrating performance by increasing the strength of the electric field in the dehydrating domain.

The invention claimed is:

1. An electronic osmotic dehydrator of electrophoresis style with a phase control using three-phase current, wherein it comprises a rotating drum, which turns on a drum axis, to the cylindrical inner circumference of which DC power with one polarity is applied, a caterpillar running on an endless track at a given space from the rotating drum to which the DC power with the opposite polarity is applied, and two filter cloth belts for conveying and dehydrating of sludge as wound between the rotating drum and the caterpillar, and it has a power applying structure that the three-phase alternating current power is used as input power and the DC power with opposite polarities to each other is applied respectively to the rotating drum and the caterpillar; and wherein the DC power of the power applying structure has a structure that it is converted into the variable DC power through a phase control circuit formed by combining thyrist electrical elements that a gate terminal is provided in the three-phase alternating current power with a controller, the variable converted DC power with the one polarity is applied to the rotating drum, the variable DC power with the opposite polarity is applied only to a section of the caterpillar corresponding to the dehydrating domain where the rotating drum and the caterpillar rotate on the same path, and the rotating drum has a structure that the edge of the multi-layer plate on which a stainless plate, a copper plate, a titanium plate and a platinum-based coating agent are laid in order, is perforated to provide a plural number of fastening holes, a plurality of round bars made of metal material having low electrical conductivity are inserted respectively into fastening holes and further fixed by welding, and respective plates are tightly fixed to respective round bars by a plurality of tapping bolts made of insoluble material.

2. An electronic osmotic dehydrator of electrophoresis style with a phase control using three-phase current according to claim 1, wherein a dehydrating domain is a domain that an electric field is generated in a space of the section where the rotating drum and the caterpillar are running on the same path.

3. An electronic osmotic dehydrator of electrophoresis style with a phase control using three-phase current according to claim 1, wherein a gate terminal for controlling the on/off operation of the thyrist electrical element is provided in the thyrist electrical element of the phase control circuit.

4. An electronic osmotic dehydrator of electrophoresis style with a phase control using three-phase current according to claim 1, wherein the controller of the phase control circuit can control the signal voltage applied to the gate terminal of the thyrist electrical element.

5. An electronic osmotic dehydrator of electrophoresis style with a phase control using three-phase current according to claim 1, wherein a copper plate having a band shape, of which the surface is in contact with variable DC power with one polarity, is additionally laid on the end of the cylindrical inner circumference of the rotating drum (100).

* * * * *